(12) United States Patent
Tang

(10) Patent No.: US 9,313,212 B2
(45) Date of Patent: Apr. 12, 2016

(54) DYNAMIC ADJUSTMENT OF AUTHENTICATION MECHANISM

(71) Applicant: International Business Machines Corporation, Armonk, NY (US)

(72) Inventor: Weng Sing Tang, Singapore (SG)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 141 days.

(21) Appl. No.: 13/847,420

(22) Filed: Mar. 19, 2013

(65) Prior Publication Data

US 2014/0289827 A1    Sep. 25, 2014

(51) Int. Cl.
  *H04L 29/06* (2006.01)
(52) U.S. Cl.
  CPC .............. *H04L 63/107* (2013.01); *H04L 63/08* (2013.01)
(58) Field of Classification Search
  CPC ... H04L 63/08; H04L 63/102; H04L 63/0815; H04L 63/10; H04L 63/083; H04L 63/107; G06F 21/10; H04N 21/43615
  See application file for complete search history.

(56) References Cited

U.S. PATENT DOCUMENTS

| 2005/0097320 | A1 | 5/2005 | Golan et al. | |
|---|---|---|---|---|
| 2005/0272445 | A1 | 12/2005 | Zellner | |
| 2008/0172715 | A1 | 7/2008 | Geiger et al. | |
| 2010/0017874 | A1 | 1/2010 | Piccinini et al. | |
| 2010/0022254 | A1 | 1/2010 | Ashfield et al. | |
| 2010/0027892 | A1* | 2/2010 | Guan et al. | 382/203 |
| 2010/0306823 | A1* | 12/2010 | Durand | 726/4 |
| 2012/0202459 | A1 | 8/2012 | Martell et al. | |
| 2012/0203663 | A1 | 8/2012 | Sinclair et al. | |
| 2013/0055348 | A1* | 2/2013 | Strauss et al. | 726/3 |

FOREIGN PATENT DOCUMENTS

| AU | 2011200445 | 8/2012 |
|---|---|---|
| CN | 102316452 | 1/2012 |

OTHER PUBLICATIONS

Herfurt, Martin, et al.; Remote Device Identification based on Bluetooth Fingerprinting Techniques; Dec. 20, 2004.
Pang, Jeffrey, et al.; 802.11 User Fingerprinting; Sep. 2007.
Bardram, Jakob E., et al.; Context-Aware User Authentication—Supporting Proximity-Based Login in Pervasive Computing; UbiComp 2003: Ubiquitous Computing; 2003.

(Continued)

*Primary Examiner* — Syed Zaidi
*Assistant Examiner* — Ghodrat Jamshidi
(74) *Attorney, Agent, or Firm* — James L. Baudino

(57) ABSTRACT

According to one aspect of the present disclosure, a method and technique for dynamic adjustment of authentication mechanism is disclosed. The method includes: collecting location data of one or more agents relative to an agent attempting to authenticate to a data processing system; determining if the location data meets a threshold value; and responsive to the location data meeting the threshold value, relaxing an authentication scheme for the attempting agent to authenticate to the data processing system.

9 Claims, 5 Drawing Sheets

(56) References Cited

OTHER PUBLICATIONS

Bardram, Jakob E.; Research: Security, Usability, and User Authentication; Sep. 4, 2011 (http://www.itu.dk/people/bardram/pmwiki/?n=Research.UserAuthentication).

Zhang, Feng, et al.; Location-Based Authentication and Authorization Using Smart Phones; TRUSTCOM '12; Proceedings of the 2012 IEEE 11th International Conference on Trust, Security and Privacy in Computing and Communications; Abstract; Jun. 2012.

* cited by examiner

DYNAMIC ADJUSTMENT OF AUTHENTICATION MECHANISM

BACKGROUND

Authentication is used to establish/verify the identity of the user prior to the user being granted access to a system/service. The strength of the authentication scheme oftentimes correlates to the sensitivity and criticality of the system/service, which in turn, correlates to the complexity of the authentication scheme adopted. For example, the authentication scheme may include a first factor authentication passwords and/or the use of multiple factor authentications (e.g., a password authentication followed by a token-based authentication).

BRIEF SUMMARY

According to one aspect of the present disclosure a method and technique for dynamic adjustment of authentication mechanism is disclosed. The method includes: collecting location data of one or more agents relative to an agent attempting to authenticate to a data processing system; determining if the location data meets a threshold value; and responsive to the location data meeting the threshold value, relaxing an authentication scheme for the attempting agent to authenticate to the data processing system.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
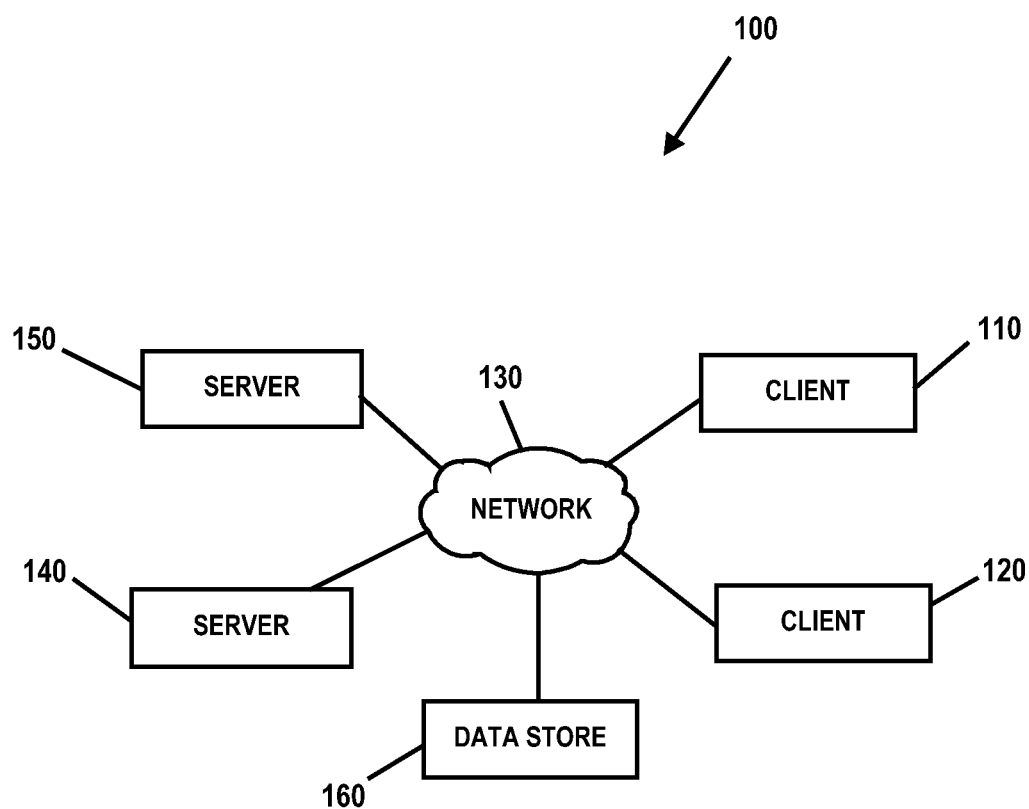
FIG. 1 is an embodiment of a network of data processing systems in which the illustrative embodiments of the present disclosure may be implemented.

Embodiments of the present disclosure provide a method, system and computer program product for dynamic adjustment of authentication mechanism. For example, in some embodiments, the method and technique includes: collecting location data of one or more agents relative to an agent attempting to authenticate to a data processing system; determining if the location data meets a threshold value; and responsive to the location data meeting the threshold value, relaxing an authentication scheme for the attempting agent to authenticate to the data processing system. Thus, embodiments of the present disclosure enable the complexity of an authentication scheme to be relaxed/reduced based on external factors relative to a user/device attempting to authenticate to a computing system. In some embodiments, the proximity of other users/devices/agents to the agent attempting to authenticate to the system may indicate that a sufficient level of security is present to warrant authenticating the agent using an authentication scheme of lesser complexity than would ordinarily be applied. The proximity information may be evaluated for the quantity and/or relative locations of other users/devices/agents relative to the agent attempting to authenticate to the system to dynamically evaluate the level of authentication scheme to apply.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
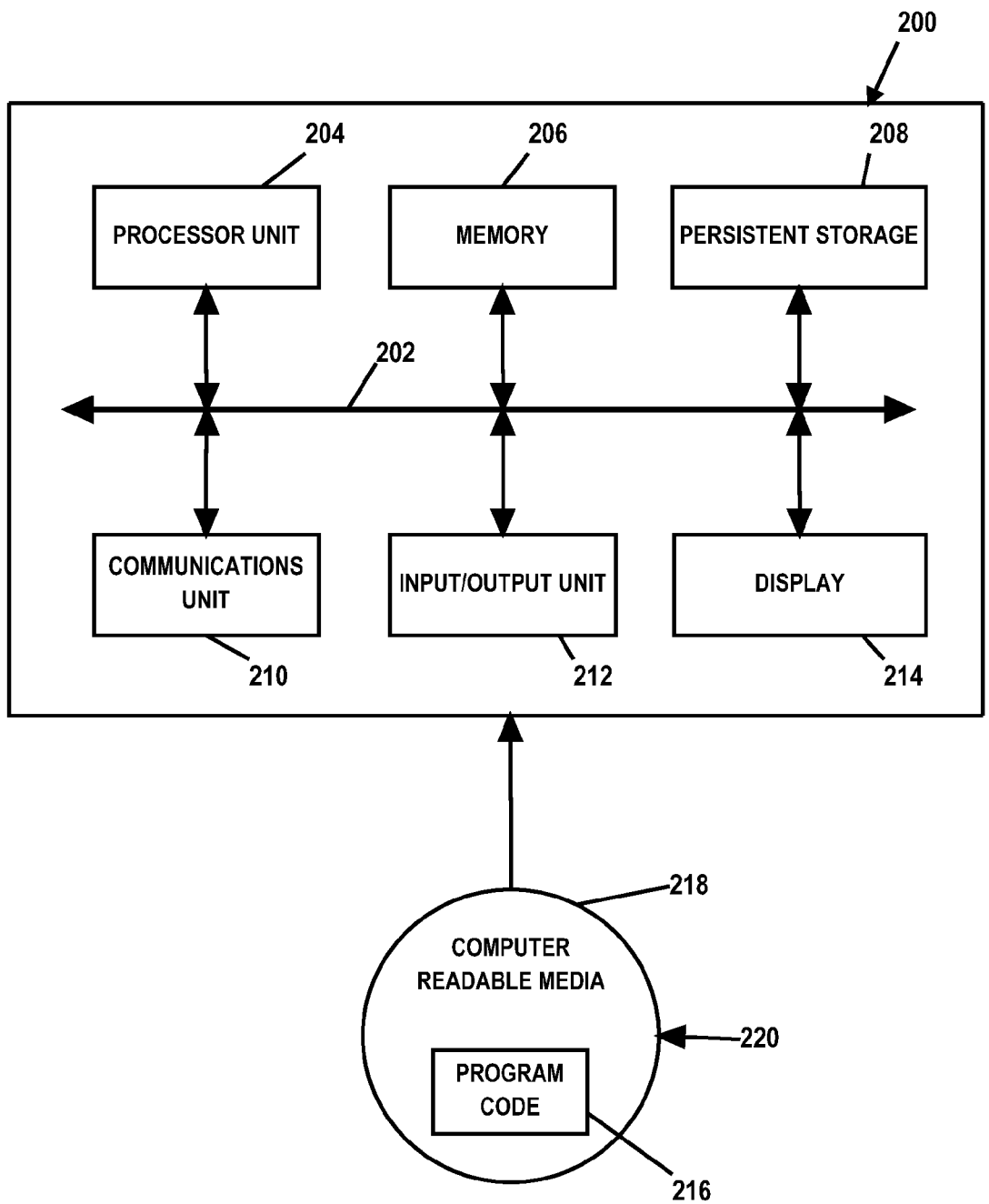
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for dynamic adjustment of authentication mechanism according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
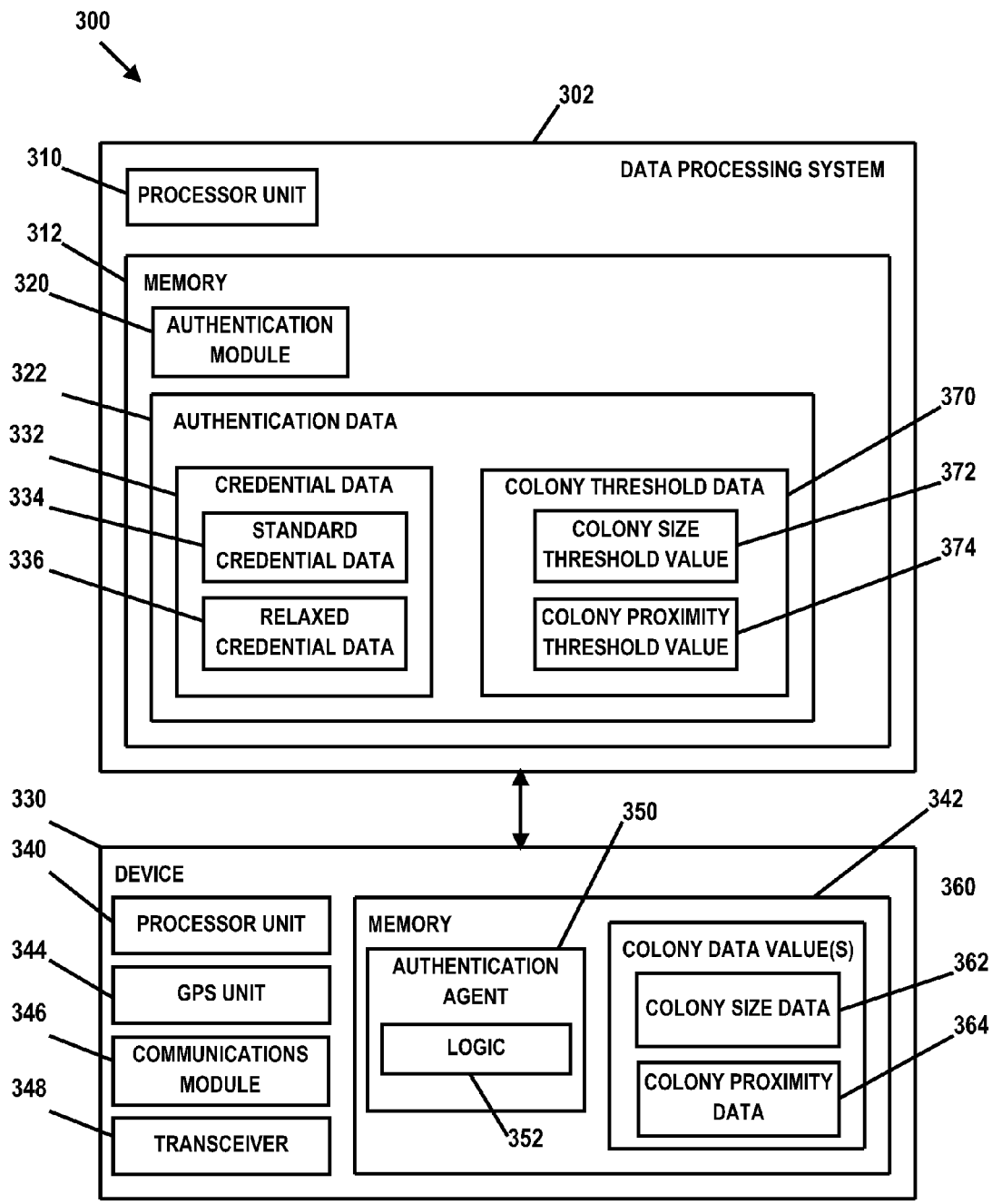
FIG. 3 is a diagram illustrating an embodiment of a computing environment in which illustrative embodiments of a system for dynamic adjustment of authentication mechanism according to the present disclosure may be implemented.

FIG. 3 is a diagram illustrating a computing environment in which an embodiment of a system 300 for dynamic adjustment of authentication mechanism according to the present disclosure may be implemented. In the illustrated embodiment, system 300 includes a data processing system 302 such as, but not limited to, client 110 and/or server 140, having a processor unit 310 and a memory 312. In FIG. 3, memory 312 includes an authentication module 320 and authentication data 322. Authentication module 320 is used to authenticate the identity of a user for accessing various system 302 applications, data, services and/or functions. For example, a user may attempt to login and/or otherwise authenticate his/her identity using a device 330. Device 330 may comprise any type of data processing and/or computing system such as, but not limited to, a smartphone, laptop computer, notepad, desktop computer, tablet computer, etc. Device 330 may communicate with system 302 over a wired and/or wireless network such as, but not limited to, a LAN, WAN, telecommunications infrastructure, or the Internet. Authentication module 320 may be configured to require/receive one or more credentials from the user (e.g., input through and/or via device 330) such that the received credentials may be verified to authenticate the identity of the user of device 330. Such credentials may comprise a username, password, personal identification number (PIN), security token, biometric data, or other type of credential.

In FIG. 3, authentication data 322 includes credential data 332 comprising information associated with authenticating the identity of a user of device 330. Credential data 332 may include the information against which the credentials received from the user of device 330 are compared for granting access to system 302. Credential data 332 may also include one or more authentication scheme policies/implementations regarding the level and/or complexity of credential authentication required based on dynamic external factors. For example, as will be described in greater detail below, authentication module 320 is configured to dynamically alter the credential authentication scheme required to access system 302 based on one or more external factors associated with and/or relative to device 330. In the illustrated embodiment, authentication data 332 includes standard credential data 334 and relaxed credential data 336. Standard credential data 334 may comprise information associated with a normal and/or standard authentication scheme for authenticating the identity of a user of device 330 to meet the security policies associated with system 300. Relaxed credential data 336 may comprise information associated with a relaxed authentication scheme for authenticating the identity of a user of device 330 (e.g., reduced complexity). For example, in some embodiments, standard credential data 334 may comprise an authentication scheme that includes multiple implementations (e.g., for an Intranet system, the scheme may comprise basic authentication implementation and a token-based second factor authentication). An adjustment to the standard scheme to reduce the complexity thereof may result in a reduction in the overall strength of the authentication scheme. Embodiments of the present disclosure utilize external factors associated with device 330 to invoke a relaxed authentication scheme without compromising the overall strength of authentication to system 302. As an example, consider that a particular standard authentication scheme requires a two-factor authentication (e.g., a basic authentication requiring a complex string of a minimum of twelve alphanumeric characters and a one-time-password (OTP) second-factor sent via short message service (SMS) to the respective device 330 of the user). Based on external factors associated with device 330, the authentication scheme may be relaxed to a certain extent (e.g., the basic authentication credential policy could be relaxed from a minimum of twelve alphanumeric characters to eight alphanumeric characters (or less) with the possible omission of the second-factor authentication).

In FIG. 3, device 330 includes a processor unit 340, a memory 342, a global positioning system (GPS) unit 344, a communications module 346, and a transceiver 348. It should be understood that the various components and/or functions of device 330 may vary based on the type of device 330, the communication channels utilized by device 330, etc. In the illustrated embodiment, memory 342 includes an authentication agent 350 for interacting and/or communicating with authentication module 320 for authenticating an identity of a user of device 330. Authentication agent 350 is also configured to obtain, collect and/or analyze various external factors relative to device 330 that may be used by authentication module 320 to dynamically determine the authentication scheme to apply for the user of device 330. Although a single device 330 is illustrated in FIG. 3, it should be understood that other devices 330 of other users may be similarly configured. GPS unit 344 may be used to gather geopositional data of device 330. Communications module 346 may be used to communicate with system 302 and/or other devices 330.

Transceiver 348 may be used to facilitate wireless communications between device 330 and system 302 and/or other devices 330.

Authentication agent 350 comprises logic 352 for communicating/interacting with other devices 330 (e.g., agents 350 of other devices 330) in proximity (via the respective locations of each agent 350) to collect stimulus/external factor data such as the location and/or presence of agents 350 relative to each other. The various agents 350 may interact with one another such that location/presence information may be cascaded through the collection of communicating agents 350. Consequently, the resultant group data (e.g., size and/or location) and/or "colony size" of agents 350 (along with other attributes) may be collected by and/or passed onto the agent 350 attempting to authenticate to system 302. For example, in the illustrated embodiment, one or more colony location data values 360 may be derived based on the collected location/presence information of agents 350. In FIG. 3, colony values 360 include colony size data 362 and colony proximity data 364. Colony size data 362 may comprise information and/or a derived value representative of the size of the group/colony of agents 350 within a particular area (e.g., the quantity of agents 350 within close proximity to the agent 350 attempting to authenticate to system 302). Colony proximity data 364 may comprise information and/or a derived value representative of the distance of other agents 350 relative to the agent 350 attempting to authenticate to system 302. Colony value(s) 360 may be communicated by the device 330 attempting to authenticate to system 302 to authentication module 320. Authentication module 320 may then compare the colony value(s) 360 to colony data 370 to determine whether a standard or relaxed credential authentication scheme should be applied to the attempting agent 350. For example, colony data 370 may include a colony size threshold value 372 and a colony proximity threshold value 374.

Authentication module 320 and agent 350 may be implemented in any suitable manner using known techniques that may be hardware-based, software-based, or some combination of both. For example, module 320 and/or agent 350 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Figure 4:
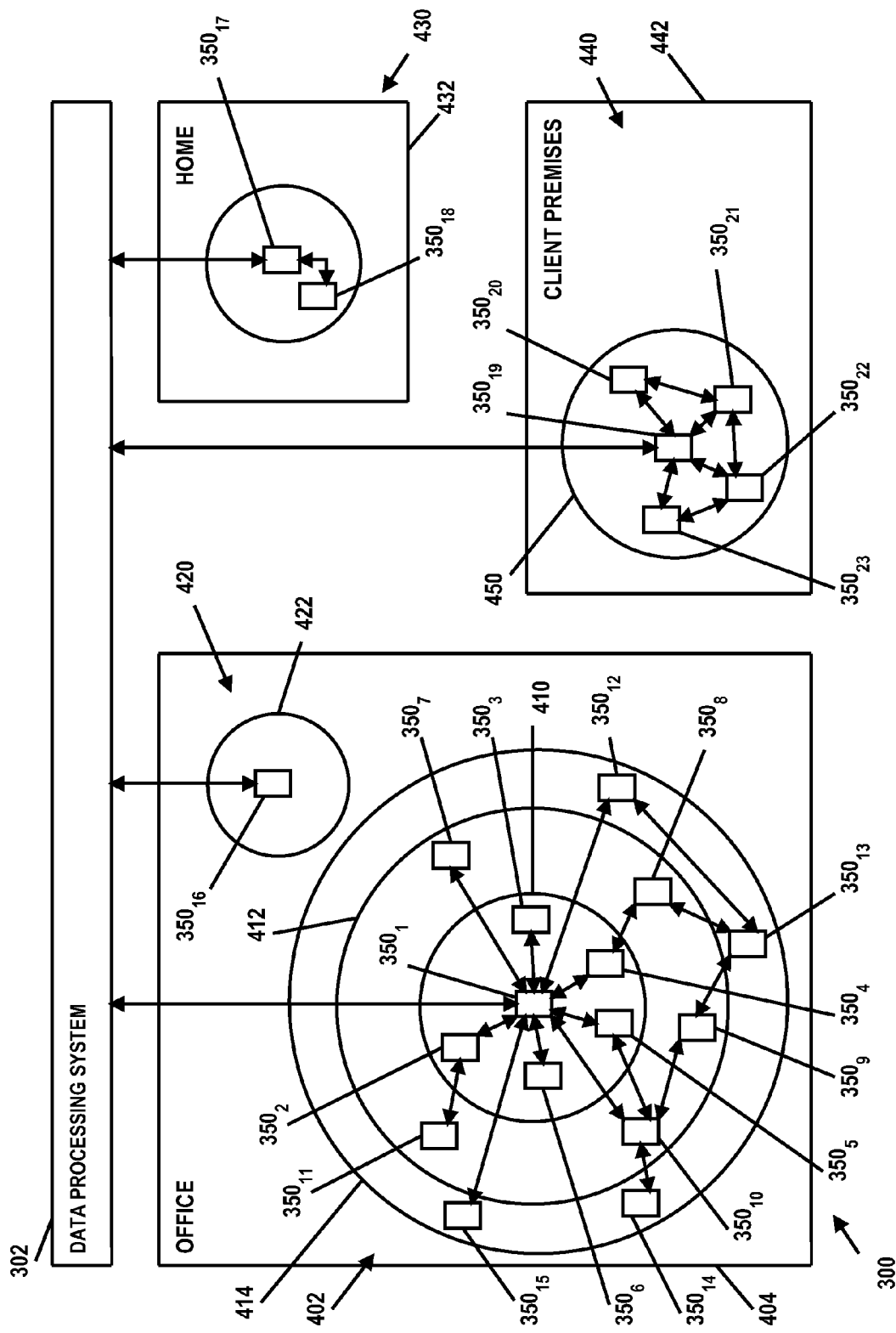
FIG. 4 is a diagram illustrating exemplary applications of a dynamic adjustment of authentication mechanism according to the present disclosure.

FIG. 4 is a diagram illustrating various operational examples/scenarios of the dynamic adjustment of authentication mechanism according to the present disclosure. In the embodiment illustrated FIG. 4, four different authentication examples/scenarios are illustrated; however, it should be understood that other/additional applications may also be used. The first scenario 402 depicts an agent $350_1$ attempting to authenticate to system 302 in an office environment 404. In the scenario 402, various other agents $350_2$-$350_{15}$ are in close proximity to agent $350_1$. As described above, agents 350 may interact with other to collect and/or communicate positional information of the various agents 350 relative to each other (e.g., collected via GPS unit 344 and/or other positional acquisition devices). The agents 350 may interact/communicate with each other via communications module 346 and respective transceivers 348 or other types of communication devices/methods. Based on the presence and/or "strength" of the colony of agents 350 (e.g., agents $350_2$-$350_{15}$) relative to agent $350_1$ attempting to authenticate to system 302, agent $350_1$ negotiates with authentication module 320 for a relaxation of the authentication scheme. Module 320 may grant the relaxed authentication scheme if the "strength" of the colony of agents 350 meets some predefined threshold (e.g., threshold values 372 and/or 374).

In FIG. 4, agents $350_2$-$350_{15}$ are located at various distances relative to a location of agent $350_1$. In some embodiments, the authenticating agent $350_1$ may calculate and/or otherwise derive a colony value 360 based on the quantity of other agents 350 within some predefined distance or proximity zone of the authenticating agent $350_1$. In some embodiments, the authenticating agent $350_1$ may calculate and/or otherwise derive a colony value 360 based on the locations/distances of the other agents 350 relative to the authenticating agent $350_1$. For example, in FIG. 4, three different proximity zones 410, 412 and 414 of varying distances relative to agent $350_1$ are illustrated. Zone 410 extends some predefined distance from agent $350_1$, zone 412 extends a farther distance from agent $350_1$ than zone 410, and zone 414 extends a farther distance from agent $350_1$ than zone 412. The distances of each proximity zone 410, 412 and 414 may vary based on the security requirements for accessing system 302. Agent $350_1$ may calculate and/or derive colony value(s) 360 based on a variety of different methods. For example, in some embodiments, colony size value 362 may be derived based on the quantity of other agents 350 (e.g., agents $350_2$-$350_{15}$) within some predefined distance from the authenticating agent $350_1$. The predefined distance may be, for example, zone 410, 412 or 414 (e.g., based on a single cluster of agents located within the predefined distance from agent $350_1$). Thus, for example, if security requirements limit the proximity zone to zone 410, agents 350 located within proximity zone 410 relative to agent $350_1$ (i.e., agents $350_2$-$350_6$) would be used to derive colony size value 362. If colony size value 362 meets (or exceeds) colony size threshold value 372, module 320 may grant the relaxed credential scheme 336 for authenticating agent $350_1$.

In some embodiments, multiple clusters of agents 350 may be used to derive colony size value 362. For example, in some embodiments, different weights may be assigned/allocated to different proximity zones such that the assigned weights are used to moderate the influence of each zone to the overall colony size. In this embodiment, a weight $W_1$ may be assigned to the quantity of agents 350 located within zone 410, a weight $W_2$ may be assigned to the quantity of agents 350 located within zone 412, a weight $W_3$ may be assigned to the quantity of agents 350 located within zone 412, etc. The quantity of agents 350 for a particular proximity zone may be calculated based on all agents within a particular zone (e.g., for zone 412, agents $350_2$-$350_{11}$) or based only on those agents that are located beyond a smaller/inner zone (e.g., for zone 412, agents $350_7$-$350_{11}$). The weighted values may then be summed and/or otherwise combined to derive an overall colony size value 362 taking into account multiple clusters of agents 350 relative to the authenticating agent $350_1$.

In some embodiments, the proximity and/or distance of each agent 350 relative to the authenticating agent $350_1$ may be used to derive colony proximity value 364. For example, in some embodiments, the average distance of other agents 350 from the authenticating agent $350_1$ may be calculated based on the distance of each other agent 350 from the authenticating agent $350_1$ for a predefined zone. For example, if zone 412 is used, colony proximity value 364 may be calculated by determining the distance of each of agents $350_2$-$350_{11}$ relative to agent $350_1$ and dividing by the quantity of distances/agents $350_2$-$350_{11}$ (e.g., summing each of the distances for agents $350_2$-$350_{11}$ and dividing by ten). If colony proximity value 364 meets (or is less than) colony proximity threshold value 374, module 320 may grant the relaxed credential scheme 336 for authenticating agent $350_1$.

Similar to as described above, multiple clusters of agents 350 could be factored into the equation for deriving colony proximity value 364. For example, by assigning each cluster identified with corresponding weights to normalize their influence to the proximity, colony proximity value 364 may be calculated using multiple clusters of agents 350. In this example, the average distance of agents 350 relative to the authenticating agent $350_1$ may be derived for each cluster/zone and then divided by the number of clusters considered. For example, an average distance $D_1$ representing the average distance based on the distances of agents $350_2$-$350_6$ relative to agent $350_1$ (zone 410) may be assigned a weighted value $W_1$, an average distance $D_2$ representing the average distance based on the distances of agents $350_7$-$350_{11}$ relative to agent $350_1$ (zone 412) may be assigned a weighted value $W_2$, an average distance $D_3$ representing the average distance based on the distances of agents $350_{12}$-$350_{15}$ relative to agent $350_1$ (zone 414) may be assigned a weighted value $W_3$, etc. The weighted values may then be summed and/or otherwise combined and divided by the quantity of weighted values to derive an overall average colony proximity value 364. Thus, it should be understood that a variety of methods may be used to derive colony values 360.

Thus, in scenario 402, due to the quantity and/or proximity of other agents 350 relative to the authenticating agent $350_1$, module 320 is likely to grant relaxed authentication credential scheme 336 (e.g., perhaps representing a scenario where agent $350_1$ is authenticating to system 302 during normal business hours within a corporate office with other users/devices 330 in close proximity to the authenticating agent $350_1$). For example, in typical day-to-day operations in an office environment, staff/employees may be in the presence of other staff/employees. A relaxation of the authentication scheme, which may be possible for the majority of the staff/employees having to perform multiple authentications across systems daily, will result in a less complex authentication scheme and potentially improve productivity (with faster authentication and less authentication errors) without compromising the security of the system. Reducing the complexity of the authentication scheme, without affecting the overall security, enables the users to adopt more secure credentials only when necessary.

Scenario 420 may represent an agent $350_{16}$ authenticating to system 302. Even though agent $350_{16}$ is perhaps in the same building/office as agent $350_1$, since agent $350_{16}$ is in a separate location with no other users/agents 350 in close vicinity/proximity (e.g., within a proximity zone 422), the colony that the agent $350_{16}$ is in comprises only a single agent and, as a result, the strength of the colony is comparatively weaker than the example in scenario 402. In such a case, the agent $350_{16}$ may not be accorded with the relaxed authentication credential scheme 336.

Scenario 430 represents an agent $350_{17}$ attempting to login/authenticate to system 302 from the user's home 432. In this example, the user's devices 330 may comprise the user's mobile phone and notebook computer (with respective agents $350_{17}$ and $350_{18}$). Since only the user's mobile devices 330 collectively constitute the colony in this scenario 430, the strength of the colony (size and/or proximity) may not be adequate to permit a relaxation of the authentication scheme.

Scenario 440 represents an agent $350_{19}$ logging into/authenticating to system 302 from a client's premises 442. In this example, the user may be located at the client premises together with other project/team members (having respective devices 330 with respective agents $350_{20}$-$350_{23}$). Although the client premises 442 location may not be considered as trusted as, for example, the office 404 environment, agent $350_{19}$ may be accorded with a relaxed authentication scheme 336 for the access to the system 302 since the colony of other agents 350 (e.g., $350_{20}$-$350_{23}$) within a proximity zone 450 of agent $350_{19}$ provides sufficient colony strength and/or assurance that the user is unlikely to be an imposter in the presence of other agents 350.

In the embodiments illustrated in FIGS. 3 and 4, an authenticating agent 350 of a device 330 is configured to acquire/collect location information associated with other agents 350 near the authenticating agent 350 and calculate/derive colony value(s) 360, which then may be evaluated by authentication module 320. However, it should be understood that in other embodiments, authentication module 320 may be configured to collect/acquire location information corresponding to other agents 350 near the authenticating agent 350 and calculate/derive colony value(s) 360. For example, authentication module 320 may be configured to interact/communicate with other agents 350 that have previously been and/or are currently logged in/authenticated to system 302 to collect/acquire location information for the respective agents 350. In response to a particular agent 350 desiring to access/authenticate to system 302, module 320 may determine/obtain a location of the requesting/attempting agent 350 and use the location information acquired/collected for other agents 350 in the vicinity of the requesting/attempting agent 350 to calculate/derive colony value(s) 360 to compare against thresholds 372 and/or 374.

Figure 5:
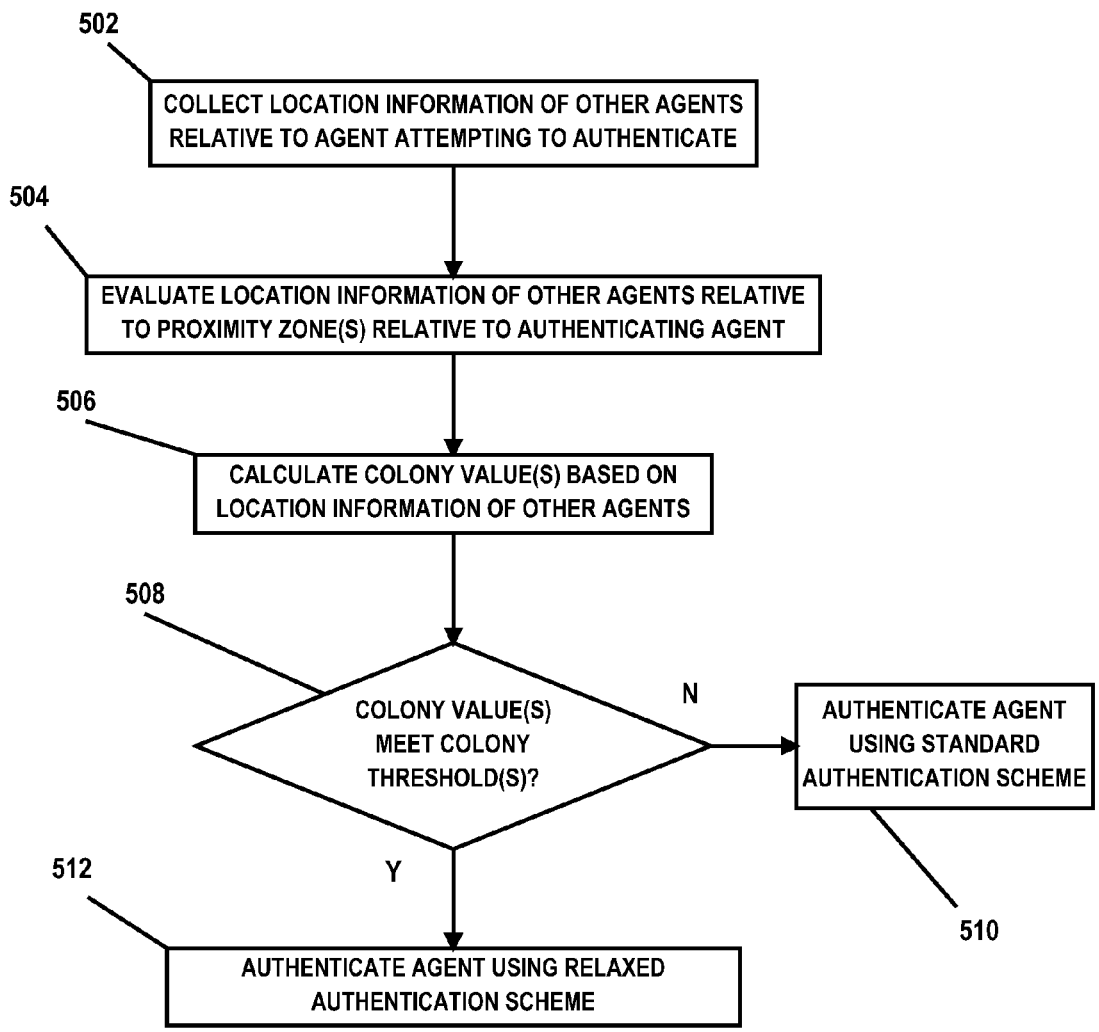
FIG. 5 is a flow diagram illustrating an embodiment of a method for dynamic adjustment of authentication mechanism according to the present disclosure.

FIG. 5 is a flow diagram illustrating an embodiment of a method for dynamic adjustment of authentication mechanism according to the present disclosure. The method begins at block 502, where location information is collected for agents 350 in proximity to an agent 350 attempting to authenticate to system 302. In some embodiments, location information may be collected upon activation of device 330/agent 350 or in response to a launch of agent 350 to authenticate a user of device 330 to system 302. At block 504, the collected location information is evaluated corresponding to one or more proximity zones relating to the authenticating agent. For example, the location information may be applicable to a single proximity zone or multiple proximity zones (e.g., clusters of agents 350 located in proximity to the authenticating agent 350). At block 506, one or more colony values 360 are derived/calculated based on the location information. The colony values 360 may be based on the quantity, distances or other criteria relative to a location of the authenticating agent 350. The colony values 360 may also be based on weighted values according to the locations of other agents 350 in various different proximity zones relative to the authenticating agent 350.

At decisional block 508, a determination is made whether the colony value(s) 360 meet one or more corresponding threshold values (e.g., values 372 and/or 374). If not, the method proceeds to block 510, where authentication module 320 authenticates and/or otherwise applies a standard authentication scheme (or an authentication scheme of a particular security level) for authenticating the attempting agent 350. If at decisional block 508 a determination is made that the colony value(s) 360 meet one or more corresponding threshold values (e.g., values 372 and/or 374), the method proceeds to block 512, where authentication module 320 authenticates and/or otherwise applies a relaxed authentication scheme (or an authentication scheme of lesser complexity than the standard authentication scheme) for authenticating the attempting agent 350.

Thus, embodiments of the present disclosure enable the complexity of an authentication scheme to be relaxed/reduced based on external factors relative to a user/device attempting to authenticate to a computing system. In some embodiments, the proximity of other users/devices/agents to the agent attempting to authenticate to the system may indicate that a sufficient level of security is present to warrant authenticating the agent using an authentication scheme of lesser complexity than would ordinarily be applied. The proximity information may be evaluated for the quantity and/or relative locations of other users/devices/agents relative to the agent attempting to authenticate to the system to dynamically evaluate the level of authentication scheme to apply. Thus, embodiments of the present disclosure enable the complexity of an authentication scheme to be relaxed/reduced based on external factors relative to a user/device attempting to authenticate to a computing system without compromising the overall security of the system. Further, in some embodiments, the present disclosure may be used as a further level of security to augment an authentication scheme as an additional authentication factor. For example, in some embodiments, if the proximity and/or quantity of other users/devices/agents to the agent attempting to authenticate to the system meets a threshold value, authentication of the agent may then proceed (e.g., utilizing a standard or normal authentication scheme).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
collecting location data of one or more agents relative to an agent attempting to authenticate to a data processing system, wherein collecting the location data comprises:
  determining a distance of each of the one or more agents from the attempting agent for the one or more agents located within a first proximity zone relative to the attempting agent;
  determining a distance of each of the one or more agents from the attempting agent for the one or more agents located within a second proximity zone relative to the attempting agent, the second proximity zone extending farther from the attempting agent than the first proximity zone;
  determining a first average distance based on the determined distances within the first proximity zone;
  determining a second average distance based on the determined distances within the second proximity zone;
  assigning a first weighted value to the first average distance;
  assigning a second weighted value to the second average distance; and
  calculating a value to be compared to the threshold value based on the first and second weighted values;
determining if the value meets a threshold value; and
responsive to the value meeting the threshold value, enabling authentication for the attempting agent to the data processing system using a relaxed authentication scheme.

2. The method of claim 1, wherein collecting the location data comprises determining a quantity of the one or more agents within at least one of the first and second proximity zones relative to the attempting agent.

3. The method of claim 1, wherein collecting the location data comprises:
determining a first quantity of the one or more agents within the first proximity zone relative to the attempting agent;
determining a second quantity of the one or more agents within the second proximity zone relative to the attempting agent;
assigning a third weighted value to the first quantity;
assigning a fourth weighted value to the second quantity; and
calculating another value to be compared to the threshold value based on the third and fourth weighted values.

4. A system, comprising:
a processor; and
logic executable by the processor to:
  collect location data of one or more agents relative to an agent attempting to authenticate to a data processing system, wherein the logic is executable to:
    determine a distance of each of the one or more agents from the attempting agent for the one or more agents located within a first proximity zone relative to the attempting agent;
    determine a distance of each of the one or more agents from the attempting agent for the one or more agents located within a second proximity zone relative to the attempting agent, the second proximity zone extending farther from the attempting agent than the first proximity zone;

determine a first average distance based on the determined distances within the first proximity zone;

determine a second average distance based on the determined distances within the second proximity zone;

assign a first weighted value to the first average distance;

assign a second weighted value to the second average distance; and calculate a value to be compared to the threshold value based on the first and second weighted values;

determine if the value meets a threshold value; and responsive to the value meeting the threshold value, enable authentication for the attempting agent to the data processing system using a relaxed authentication scheme.

5. The system of claim 4, wherein the logic is executable to determine a quantity of the one or more agents within at least one of the first and second proximity zones relative to the attempting agent.

6. The system of claim 4, wherein the logic is executable to:

determine a first quantity of the one or more agents within the first proximity zone relative to the attempting agent;

determine a second quantity of the one or more agents within the second proximity zone relative to the attempting agent;

assign a third weighted value to the first quantity;

assign a fourth weighted value to the second quantity; and calculate another value to be compared to the threshold value based on the third and fourth weighted values.

7. A computer program product for dynamic adjustment of authentication mechanism, the computer program product comprising:

a non-transitory computer readable medium having computer readable program code embodied therewith, the computer readable program code comprising computer readable program code configured to:

collect location data of one or more agents relative to an agent attempting to authenticate to a data processing system, wherein the program code is configured to:

determine a distance of each of the one or more agents from the attempting agent for the one or more agents located within a first proximity zone relative to the attempting agent;

determine a distance of each of the one or more agents from the attempting agent for the one or more agents located within a second proximity zone relative to the attempting agent, the second proximity zone extending farther from the attempting agent than the first proximity zone;

determine a first average distance based on the determined distances within the first proximity zone;

determine a second average distance based on the determined distances within the second proximity zone;

assign a first weighted value to the first average distance;

assign a second weighted value to the second average distance; and calculate a value to be compared to the threshold value based on the first and second weighted values;

determine if the value meets a threshold value; and responsive to the value meeting the threshold value, enable authentication for the attempting agent to the data processing system using a relaxed authentication scheme.

8. The computer program product of claim 7, wherein the computer readable program code is configured to determine a quantity of the one or more agents within at least one of the first and second proximity zones relative to the attempting agent.

9. The computer program product of claim 7, wherein the computer readable program code is configured to:

determine a first quantity of the one or more agents within the first proximity zone relative to the attempting agent;

determine a second quantity of the one or more agents within the second proximity zone relative to the attempting agent;

assign a third weighted value to the first quantity;

assign a fourth weighted value to the second quantity; and calculate another value to be compared to the threshold value based on the third and fourth weighted values.

* * * * *